United States Patent
Claffey et al.

(10) Patent No.: US 6,850,875 B1
(45) Date of Patent: Feb. 1, 2005

(54) METHOD AND APPARATUS FOR DETERMINING OBSCURATION OF SENSORS THAT ARE MOUNTED ON A SPACECRAFT

(75) Inventors: Douglas Claffey, Malvern, PA (US); Paul Graziani, Wayne, PA (US); Deron Ohlarik, Schwenksville, PA (US)

(73) Assignee: Analytical Graphics, Inc., Exton, PA (US)

( * ) Notice: Subject to any disclaimer, the term of this patent is extended or adjusted under 35 U.S.C. 154(b) by 0 days.

(21) Appl. No.: 09/332,760

(22) Filed: Jun. 14, 1999

(51) Int. Cl.[7] .......................... G06G 7/48; G06F 17/50; B64G 1/36
(52) U.S. Cl. ..................... 703/6; 703/7; 703/8; 703/13
(58) Field of Search .............................. 703/6, 7, 8, 13; 244/171; 701/226

(56) References Cited

U.S. PATENT DOCUMENTS

| | | | |
|---|---|---|---|
| 4,679,753 A | * 7/1987 | Landecker | 244/171 |
| 4,688,092 A | 8/1987 | Kamel et al. | 358/109 |
| 4,769,850 A | * 9/1988 | Itoh et al. | 382/132 |
| 5,204,818 A | * 4/1993 | Landecker et al. | 701/226 |
| 5,406,066 A | * 4/1995 | Steinle et al. | 250/208.1 |
| 5,469,536 A | * 11/1995 | Blank | 345/594 |
| 5,522,569 A | 6/1996 | Steffy et al. | 244/158 R |
| 5,546,309 A | 8/1996 | Johnson et al. | 364/434 |
| 5,710,839 A | * 1/1998 | Cok | 382/264 |
| 5,806,804 A | 9/1998 | Goodzeit et al. | 244/169 |
| 5,864,489 A | 1/1999 | Claffey et al. | 364/578 |
| 6,288,974 B1 | * 9/2001 | Nelson | 367/135 |

OTHER PUBLICATIONS

STK: 17 pages of printouts from stk.com pertaining to Satellite Tool Kilt. Obtained Jan. 24, 2002.*
Copyright search for TX–4–819–???.*

STK User's Manual: Version 4.0.5 for Engineering Workstations, Aug. 1998, Analytical Graphics, Inc.

STK/VO User's Manual: Version 3.0 for Engineering Workstations, Feb. 1998, Analytical Graphics, Inc.

Copyright Registration Certificate No. TX4–819–011, registered Aug. 13, 1998, Only the First and Last 25 Pages of Each.

Copyright Registration Certificate No. TX4–819–009, registered Aug. 17, 1998, Only the First and Last 25 Pages of Each.

Copyright Registration Certificate No. TX4–819–010, registered Sep. 9, 1998, Only the First and Last 25 Pages of Each.

* cited by examiner

*Primary Examiner*—Hugh Jones
(74) *Attorney, Agent, or Firm*—Roberts Abokhair & Mardula, LLC

(57) ABSTRACT

The field of view of a sensor mounted on a satellite (or other spacecraft) is obscured by various objects, such as celestial bodies and the satellite's own solar panels. A method is disclosed for visualizing and quantifying, with respect to time, variations in the portions of the sensor's field of view that are obscured. The graphical output of a satellite systems analysis program, which features high-resolution, three-dimensional, animated images of spacecraft, celestial bodies and other objects in the space environment, is utilized. The graphical output is simplified to only a few colors to differentiate only background and irrelevant objects from relevant objects. Differentiation is also made, using different colors, in representation of those portions of the field of view that overlap relevant (obscuring) objects from the remainder of the field of view which is unobscured. By counting pixels of the respective colors, frame-by-frame during animation, the percentage of obscuration over time is quantified.

28 Claims, 2 Drawing Sheets

_US 6,850,875 B1_

METHOD AND APPARATUS FOR DETERMINING OBSCURATION OF SENSORS THAT ARE MOUNTED ON A SPACECRAFT

BACKGROUND OF THE INVENTION

1. Field of the Invention

This invention relates generally to the field of spacecraft analysis, design, and operation. More specifically, this invention relates to a method and corresponding apparatus for use in planning and execution of operations using sensors mounted on a spacecraft.

2. Background Art

A typical Earth satellite or lunar or interplanetary probe has a number of objects attached to its exterior and protruding from it to varying degrees. Such objects include various types of sensors, communications antennas, thrusters, solar power panels and the like, as well as the frameworks and beams on which such objects may be mounted. Other, unintended protrusions from the spacecraft body can result from such phenomena as the partial separation of shielding material from the outer shell of the spacecraft. Conversely, a previously existing protrusion can be eliminated, as, for example, when a solar panel is lost. In addition, the body of the spacecraft itself may take on a wide variety of shapes that are often irregular.

Thus, depending on how a spacecraft-mounted sensor is attached and oriented, its field of view may be obscured (partially or totally) by the spacecraft and the objects protruding from it. Moreover, depending on the sensor's target, its field of view may be obscured by the central body around which it is orbiting (typically the Earth) or another celestial body, such as the Sun or the Moon.

Thus, an important question in spacecraft operations is the extent to which a sensor with a given assigned target is subject to obscuration at various times during the parent spacecraft's orbit or trajectory. The answer to this question can be useful for planning purposes, since it can provide the basis for selecting the optimal times for certain sensing activities. Knowing the extent to which a sensor's field of view is obscured at different times, one can schedule maneuvers to change the attitude or orbit characteristics of the spacecraft to reduce or eliminate the obscuration. Information on obscuration can also play a role in spacecraft design, since it may be possible to place the various objects on the exterior of the spacecraft in such as way as to reduce or eliminate obscuration of its sensors' fields of view.

A related invention is that disclosed in U.S. Pat. No. 5,864,489 for Method and Apparatus for Determining Exposure of Spacecraft-Mounted Solar Panels to Sun and Determination of Spacecraft Drag, which is incorporated herein by reference in its entirety.

Prior methods for calculation of sensor obscuration are accomplished only by performing complex and time-consuming mathematical operations on extensive data regarding the spacecraft's orbit or trajectory, its attitude, desired times for image capture, and other factors. Moreover, while this process may yield numerical data relating the obscuration level to time, it does not provide an easy and reliable way of modeling the data visually, to facilitate the development of alternative designs to minimize the amount of obscuration.

To overcome the shortcomings of the current approach, a method and apparatus are needed that will yield quick and reliable calculations of the degree of obscuration and, at the same time, allow for visual presentation, analysis, and modeling of the data to facilitate the design of alternatives that minimize obscuration of sensors.

SUMMARY OF THE INVENTION

In order to solve the above-noted sensor obscuration problems, the invention provides an apparatus, a method, and a computer program product for obscuration analysis, as well as a method and a computer program product for upgrading a satellite system analysis program. Methods or products according to the present invention may be embodied as signals propagated via a data transmission medium.

The present invention is preferably embodied as a software module that builds upon a satellite system analysis program that has animated three-dimensional visualization capabilities.

It is an object of the present invention to utilize the graphical output of the satellite system analysis program to determine the percentage of sensor obscuration over a given time interval.

It is an additional object of the present invention to provide for display of obscuration information, both numerically and in graphical form.

It is yet another object of the present invention to provide visualizations of sensor obscuration that enable mission planners and spacecraft designers to envision design alternatives that improve obscuration characteristics.

To accomplish some of the above objects, the present invention is embodied as a method for upgrading satellite system analysis software. One aspect of the software upgrade embodiment is supplementing the available view perspectives for the satellite system analysis program so as to include a view from the sensor on the satellite, along the boresight of the sensor. A number of code segments are added to the software. One added code segment enables a user to select objects to be taken into account for obscuration analysis. Another added code segment simplifies visual display to show selected objects in a first color and unselected objects and background in a second color. A further added code segment assigns colors to a representation of the sensor pattern of the sensor object, so as to distinguish those portions of the sensor object's field of view that are obscured by selected objects from those portions of the sensor object's field of view that are not obscured by selected objects. Another code segment that is added to the software counts and records the quantity of pixels corresponding to obscured and unobscured portions of the sensor object's field of view at each of plural animation time steps. A code segment is also added via the upgrade method that calculates and reports to a user an obscuration percentage over a predetermined time period.

As another way to accomplish some of the above objects, the present invention is also embodied as a computer program product for upgrading satellite system analysis software. The computer program software upgrade product includes software instructions for enabling the computer to perform predetermined operations, and a computer readable medium embodying those software instructions. The predetermined operations include supplementing the available view perspectives for the satellite system analysis program so as to include a view from the sensor, along the boresight of the sensor, and adding a code segment to the satellite system analysis program that enables a user to select objects to be taken into account for obscuration analysis. The predetermined operations also include adding a code segment to the satellite system analysis program that simplifies visual display to show selected objects in a first color and unselected objects and background in a second color, as well as adding a code segment to the satellite system analysis program that assigns colors to a representation of the sensor pattern of the sensor object, so as to distinguish those portions of the sensor object's field of view that are obscured by selected objects from those portions of the sensor object's field of view that are not obscured by selected objects. The predetermined operations further include adding a code segment to the satellite system analysis program that counts and records the quantity of pixels corresponding to obscured and unobscured portions of the sensor object's field of view at each of plural animation time steps, and adding a code segment to the satellite system analysis program that calculates and reports to a user an obscuration percentage over a predetermined time period.

As another way to accomplish some of the above objects, the present invention is also embodied as a method for analyzing sensor obscuration. The process includes the steps of animating a three-dimensional visualization of a satellite that includes a sensor object, the sensor object having a boresight and a sensor pattern, as well as selecting a view perspective from the sensor object along the boresight. The process further includes selecting objects of a satellite system analysis scenario that are capable of causing obscuration, and assigning a first color to the selected objects, while assigning a second color to unselected objects and background of the satellite system analysis scenario. The process also includes assigning a third color to the sensor pattern, such that, when the sensor pattern is superimposed over a visual display of the satellite system analysis scenario, portions of the sensor pattern that overlap with unselected objects and background appear in a different color than do portions of the sensor pattern that overlap with selected objects, as well as counting and recording the quantities of pixels of each color in the sensor pattern, the counting and recording being carried out at each time step of animation of the satellite system analysis scenario. The process further includes providing a graphical display to a user, during the animation, portraying the amount of obscuration of the sensor pattern, and source of obscuration of the sensor pattern, over a predetermined time period, and calculating the percentage of obscuration over said predetermined time period on the basis of the recorded pixel quantities, the calculated percentage of obscuration being displayed to the user.

As another way to accomplish some of the above objects, the present invention is also embodied as a computer program product for analyzing sensor obscuration. The computer program product includes software instructions for enabling a computer to perform predetermined operations, and a computer readable medium embodying the software instructions. The predetermined operations correspond to the processes summarized above.

As another way to accomplish some of the above objects, the present invention is also embodied as a propagated signal for use in analyzing sensor obscuration. The signal is propagated via a data transmission medium. The propagated signal includes an animation signal segment that provides for animated three-dimensional visualization of a spacecraft having a sensor object, the sensor object having a boresight and a sensor pattern, as well as a perspective selection signal segment that provides for a visualization view from the perspective of said sensor object, along said sensor object's boresight. The propagated signal further includes a selection signal segment that enables selection of obscuring objects to be taken into account in the obscuration analysis, and a simplification signal segment that simplifies visual display provided by said animation code segment to show the selected obscuring objects in a first color and show unselected objects and background in a second color. The propagated signal also includes a distinguishing signal segment that assigns a third color to portions of the sensor object's field of view that are obscured by the selected obscuring objects and a fourth color to those portions of the sensor object's field of view that are not obscured, to thereby distinguish obscured portions of the sensor object's field of view from unobscured portions of the sensor object's field of view, as well as a quantifying signal segment that counts and records a quantity of pixels corresponding to obscured portions of the sensor object's field of view at each of plural animation time steps, and that counts and records a quantity of pixels corresponding to unobscured portions of the sensor object's field of view at each of the plural animation time steps. The propagated signal also includes a results signal segment that calculates, based on the quantities of pixels counted and recorded by said quantifying code segment, and reports to a user percent obscuration of the sensor object's field of view over a predetermined time period.

As another way to accomplish some of the above objects, the present invention is also embodied as an apparatus for analyzing sensor obscuration. The apparatus preferably takes the form of a general purpose computer that implements a method according to the present invention. The general purpose computer has a processor, and a memory embodying software instructions that are adapted to enable the computer to perform operations. The operations performed correspond to a method according to the present invention, summarized above.

The present invention requires the addition of a new view perspective to those previously available, that new view being from the sensor along its boresight.

Another aspect of the invention is that it also includes a translational mechanism that causes the sensor pattern to be projected from the edges rather than from the center of the sensor object.

BRIEF DESCRIPTION OF THE DRAWINGS

Other objects and advantages of the invention will be understood as the invention is explained in detail, below, with reference to the attached drawings.

DETAILED DESCRIPTION OF THE INVENTION

Figure 1:
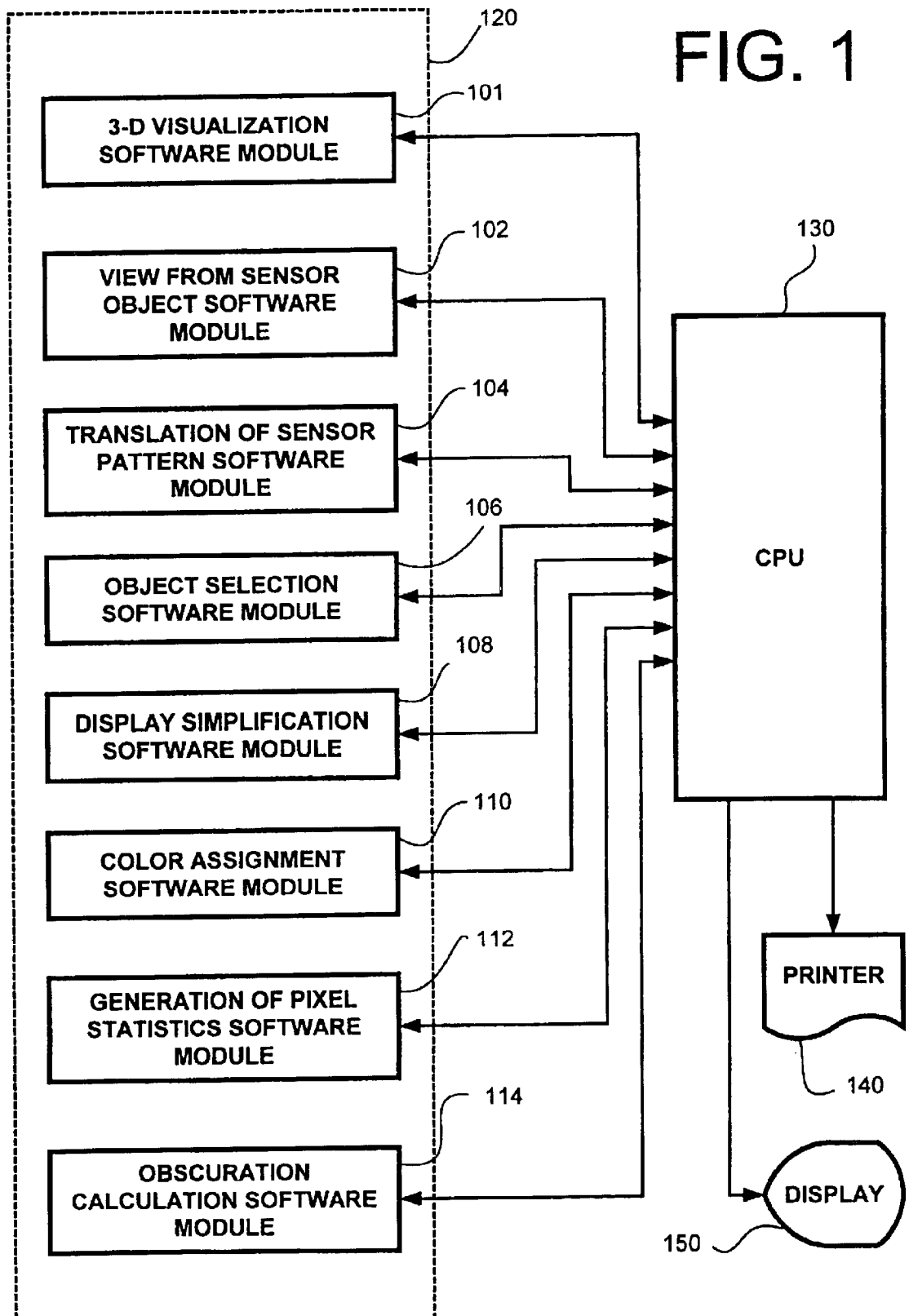
FIG. 1 illustrates a flow chart diagram of the software upgrade method aspect of the present invention.

The present invention utilizes the graphical output of a satellite systems analysis program featuring high-resolution, three-dimensional, animated images of spacecraft, celestial bodies and other objects in the space environment. An example of such a satellite systems analysis program is the Satellite Tool Kit/Visualization Option (STK/VO) created by Analytical Graphics, Inc. of Malvern, Pa. STK/VO allows a user to select from a number of view perspectives—such as satellite to Earth, satellite A to satellite B, facility to satellite, etc.—depending on how many objects there are in the satellite system analysis scenario.

The present invention includes the addition of a new view perspective to those previously available, that new view being from the sensor along its boresight. The boresight of a sensor is defined as the central axis of the sensor's field of view.

Another aspect of the invention is that it also includes a translational mechanism that causes the sensor pattern to be projected from the edges rather than from the center of the sensor object. The sensor pattern of a sensor is the spherical projection of what area may be imaged with the sensor's field of view. The sensor's field of view is the cone (typically circular, but generally having a directrix of any shape) defining what space may be sensed by the sensor at a given orientation and position. The vertex of the cone defining the sensor's field of view is located at or slightly behind the sensor.

Since there may be many objects in a typical satellite system analysis scenario, only some of which are potential sources of obscuration in a given case, the present invention provides a means of selecting those potentially interfering objects and factoring out others to be treated as background. This is manifested visually by simplifying the display (exclusive of the sensor pattern) to show relevant objects in one color, such as black, and background objects in another, such as white. When the sensor pattern, which is assigned a third color, is superimposed on the simplified display, portions of the sensor pattern that do not overlap with relevant objects—representing portions of the sensor's field of view that are unobscured—take on a different color than those that do overlap with such objects. For example, if relevant objects and background are assigned the colors black and white, respectively, a blue sensor pattern will turn yellow via the bitwise "exclusive or" operation in areas where there is no overlap with relevant (i.e., obscuring) objects and remain blue where there is such overlap.

The present invention counts and records the quantity of pixels in the sensor pattern of each color. Pixels near the edge of the view window are given reduced weight to compensate for the fact that the screen is flat, while the sensor pattern is spherical. When the scenario is animated, such a pixel count is carried out at each animation time step until the animation terminates. At the conclusion of the animation, the percentage of the sensor's field of view subject to obscuration can be computed over time, based on the pixel counts. This information can be presented via reports consisting of tables of numerical data or via graphs automatically generated by the program. According to a preferred embodiment, a graphical display of a histogram of percentage obscuration over the course of the animation is generated and displayed.

In addition, the user can observe changes in the display window over the course of the animation to get a general idea of the amount of obscuration over the time period and the identity of the object or objects causing the obscuration.

The software upgrade aspect of the present invention (refer to FIG. 1) makes modifications of a satellite system analysis program that does animated three-dimensional visualization 101. An important part of the upgrade is to add a software module 102 to the program 101 that provides for a view perspective from one of the satellite's sensors along the sensor's boresight. Another aspect of the upgrade is to add a software module 104 that provides fore the option of projecting the sensor pattern from the edges rather than from the center of the sensor object. A software module 106 is added that provides for selecting which objects are to be taken into account in the obscuration analysis. As examples, the satellite itself, things protruding from the satellite, the central body about which the satellite orbits, and other celestial bodies (i.e., other than the central body) would typically be selected as potentially obscuring objects for purposes of the obscuration analysis.

After obscuring objects are selected via the object selection software module 106, a software module 108 is added for simplifying the visual display to show the selected objects in one color and unselected objects and background in another color. A color assignment software module 110 is added that assigns colors to the visual representation of the sensor pattern to distinguish portions of the field of view that are obscured by the selected objects from those portions of the field of view that are not obscured.

Further, a software module 112 is added that generates pixel statistics by counting and recording of the quantities of pixels corresponding to obscured and unobscured portions of the sensor's field of view, at each of the program's animation time steps. Also, an obscuration calculation software module 114 is added that calculates and reports obscuration percentages over a specified time period, based on the statistics generated by the generation of pixel statistics software module 112.

All the added software modules are embodied, along with the satellite system analysis program that does animated three-dimensional visualization, in memory 120 that is associated with a CPU 130 of a general purpose computer (not shown). The results generated by the above described software are provided to the user via a display 150 and/or a printer 140.

Figure 2:
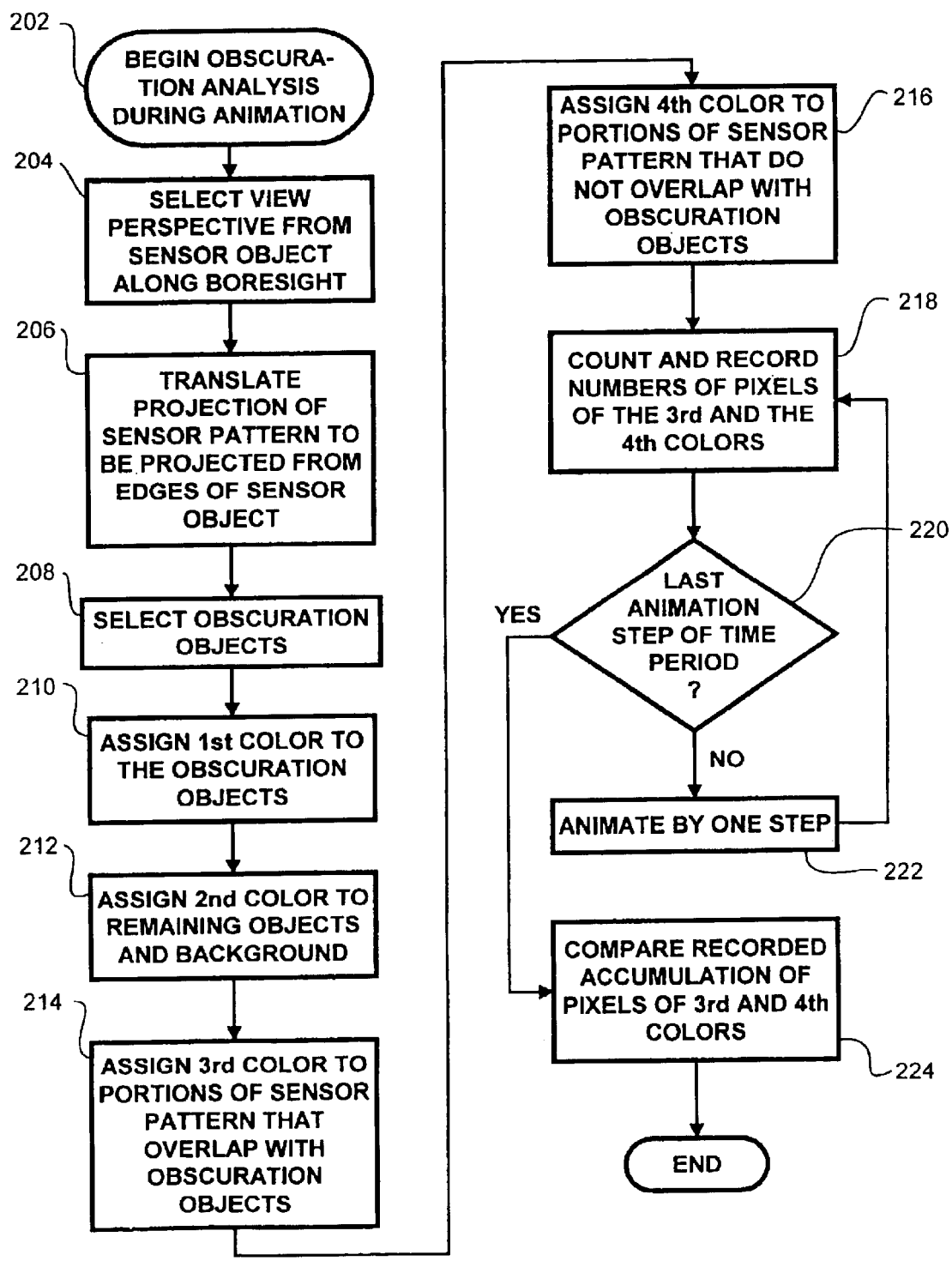
FIG. 2 illustrates a flow chart diagram of the obscuration analysis method aspect of the present invention.

Utilizing a satellite systems analysis program with animated three-dimensional visualization, modified as described above, the invention comprises a method (refer to FIG. 2) in which:

1. a view perspective from a sensor object along its boresight is selected 204;
2. the projection of the sensor pattern is translated 206 so that it projects from the edges rather than the center of the sensor object;
3. relevant objects of the satellite system analysis scenario-i.e. those capable of causing obscuration-are selected 208;
4. a color is assigned 210 to the relevant objects, while another color is assigned 212 to irrelevant objects and background;
5. a third color is assigned to the sensor pattern, such that, when the sensor pattern is superimposed over the objects in the visual display, portions of the sensor pattern that overlap with irrelevant objects and background appear in a different (i.e., fourth) color 216 than those portions that overlap with relevant objects 214;
6. the quantity of pixels of each color in the sensor pattern is counted and recorded 218, with pixels near the edge of the view window given a reduced weight to compensate for the fact that the screen is flat, whereas the sensor pattern is spherical;
7. the satellite system analysis scenario is animated, with a count of the pixels of each color in the sensor pattern carried out at each time step 220, 222, 218;
8. during the animation, a graphical display provides the user with a general idea of the amount and source(s) of obscuration during the time period;
9. at the conclusion of the animation, the percentage of obscuration over time is calculated on the basis of the pixel counts and presented in numerical and/or graphical form 224;
10. the output of the program is used for planning missions to avoid sensing activities during periods of excessive obscuration and/or to schedule maneuvers to eliminate or reduce obscuration;

11. the visual display is observed for the purpose of determining whether spacecraft design changes, such as the re-positioning of objects attached to the spacecraft, can eliminate or reduce obscuration.

The present invention is intended to encompass other variations in which multiple colors are assigned to relevant objects to distinguish, e.g., between the spacecraft and the central body and/or among various objects attached to the spacecraft, so that the source(s) of the obscuration can be more precisely determined.

The present invention has been described in terms of a preferred embodiment. However, it will be appreciated by those of skill in the art that numerous improvements and modifications may be made to the described embodiment without departing from the scope of the invention. The scope of the invention is limited only by the appended claims.

What is claimed is:

1. A process for sensor obscuration analysis, implemented via a programmable machine, the process comprising:
    animating a three-dimensional visualization of a satellite that includes a sensor object, the sensor object having a boresight and a sensor pattern;
    selecting a view perspective from the sensor object along the boresight;
    selecting objects of a satellite system analysis scenario that are capable of causing obscuration;
    assigning a first color to the selected objects;
    assigning to the sensor pattern a color that contrasts with the first color, such that, when the sensor pattern is superimposed over a visual display of the satellite system analysis scenario, portions of the sensor pattern that overlap with unselected objects and background appear in a different color than do portions of the sensor pattern that overlap with selected objects;
    counting and recording the quantities of pixels of each color in the sensor pattern, the counting and recording being carried out at each time step of animation of the satellite system analysis scenario;
    providing a graphical display to a user, during the animation, portraying the amount of obscuration of the sensor pattern, and source of obscuration of the sensor pattern, over a predetermined time period; and
    calculating the percentage of obscuration over said predetermined time period on the basis of the recorded pixel quantities, the calculated percentage of obscuration being displayed to a user.

2. The process for sensor obscuration analysis of claim 1, the process further comprising:
    translating a projection of the sensor pattern so that the sensor pattern is projected from edges of the sensor object.

3. The process for sensor obscuration analysis of claim 1, wherein the graphical display and the displayed calculated percentage of obscuration is used for planning missions to avoid sensing activities during periods of excessive obscuration.

4. The process of sensor obscuration analysis of claim 1, wherein the graphical display and the displayed calculated percentage of obscuration is used for planning missions to schedule maneuvers to eliminate or reduce obscuration.

5. The process of sensor obscuration analysis of claim 1, wherein the graphical display and the displayed calculated percentage of obscuration is used for the purpose of determining whether re-positioning of objects attached to the satellite can eliminate or reduce obscuration.

6. The process of sensor obscuration analysis of claim 1, wherein the counting and recording of pixels is carried out such that pixels near the edge of the sensor pattern are given a reduced weight to compensate for the fact that a display screen of the programmable machine is flat, while the sensor pattern is spherical.

7. A method of analyzing sensor obscuration using a satellite system analysis program having animated three-dimensional visualization of a satellite that includes a sensor object, the sensor object having a boresight and a sensor pattern, the method comprising:
    selecting a view perspective from the sensor object along the boresight;
    selecting objects of a satellite system analysis scenario that are capable of causing obscuration;
    assigning a first color to the selected objects;
    assigning to the sensor pattern a color that contrasts with the first color, such that, when the sensor pattern is superimposed over a visual display of the satellite system analysis scenario, portions of the sensor pattern that overlap with unselected objects and background appear in a different color than do portions of the sensor pattern that overlap with selected objects;
    counting and recording the quantities of pixels of each color in the sensor pattern, the counting and recording being carried out at each time step of animation of the satellite system analysis scenario;
    providing a graphical display to a user, during the animation, portraying the amount of obscuration of the sensor pattern, and source of obscuration of the sensor pattern, over a predetermined time period; and
    calculating the percentage of obscuration over said predetermined time period on the basis of the recorded pixel quantities, the calculated percentage of obscuration being displayed to the user.

8. The method of analyzing sensor obscuration of claim 7, the method further comprising:
    translating a projection of the sensor pattern so that the sensor pattern is projected from edges of the sensor object.

9. The method of analyzing sensor obscuration of claim 7, wherein the graphical display and the displayed calculated percentage of obscuration is used for planning missions to avoid sensing activities during periods of excessive obscuration.

10. The method of analyzing sensor obscuration of claim 7, wherein the graphical display and the displayed calculated percentage of obscuration is used for planning missions to schedule maneuvers to eliminate or reduce obscuration.

11. The method of analyzing sensor obscuration of claim 7, wherein the graphical display and the displayed calculated percentage of obscuration is used for the purpose of determining whether re-positioning of objects attached to the satellite can eliminate or reduce obscuration.

12. The method of analyzing sensor obscuration of claim 7, wherein the counting and recording of pixels is carried out such that pixels near the edge of the sensor pattern are given a reduced weight to compensate for the fact that a display screen is flat, while the sensor pattern is spherical.

13. A computer program product for enabling a computer to perform analysis of sensor obscuration, the computer program product comprising:
    software instructions for enabling the computer to perform predetermined operations, and
    a computer readable medium embodying the software instructions;
    the predetermined operations comprising:

animating a three-dimensional visualization of a satellite that includes a sensor object, the sensor object having a boresight and a sensor pattern;

selecting a view perspective from the sensor object along the boresight;

selecting objects of a satellite system analysis scenario that are capable of causing obscuration;

assigning a first color to the selected objects;

assigning to the sensor pattern a color that contrasts with the first color, such that, when the sensor pattern is superimposed over a visual display of the satellite system analysis scenario, portions of the sensor pattern that overlap with unselected objects and background appear in a different color than do portions of the sensor pattern that overlap with selected objects;

counting and recording the quantities of pixels of each color in the sensor pattern, the counting and recording being carried out at each time step of animation of the satellite system analysis scenario;

providing a graphical display to a user, during the animation, portraying the amount of obscuration of the sensor pattern, and source of obscuration of the sensor pattern, over a predetermined time period; and calculating the percentage of obscuration over said predetermined time period on the basis of the recorded pixel quantities, the calculated percentage of obscuration being displayed to the user.

14. The computer program product of claim 13, the predetermined operations further comprising:

translating a projection of the sensor pattern so that the sensor pattern is projected from edges of the sensor object.

15. The computer program product of claim 13, wherein the graphical display and the displayed calculated percentage of obscuration is used for planning missions to avoid sensing activities during periods of excessive obscuration.

16. The computer program product of claim 13, wherein the graphical display and the displayed calculated percentage of obscuration is used for planning missions to schedule maneuvers to eliminate or reduce obscuration.

17. The computer program product of claim 13, wherein the graphical display and the displayed calculated percentage of obscuration is used for the purpose of determining whether re-positioning of objects attached to the satellite can eliminate or reduce obscuration.

18. The computer program product of claim 13, wherein the counting and recording of pixels is carried out such that pixels near the edge of the sensor pattern are given a reduced weight to compensate for the fact that a display screen of the programmable machine is flat, while the sensor pattern is spherical.

19. A signal bearing medium propagating a signal for use in sensor obscuration analysis, the signal propagated via the signal bearing medium comprising:

an animation signal segment providing for animated three-dimensional visualization of a spacecraft having a sensor object, the sensor object having a boresight and a sensor pattern;

a perspective selection signal segment providing for a visualization view from the perspective of said sensor object, along said sensor object's boresight;

a selection signal segment that enables selection of obscuring objects to be taken into account in the obscuration analysis;

a simplification signal segment that simplifies visual display provided by said animation signal segment to show the selected obscuring objects in a first color;

a distinguishing signal segment that assigns a second color to portions of the sensor object's field of view that are obscured by the selected obscuring objects and a third color to those portions of the sensor object's field of view that are not obscured, to thereby distinguish obscured portions of the sensor object's field of view from unobscured portions of the sensor object's field of view;

a quantifying signal segment that counts and records a quantity of pixels corresponding to obscured portions of the sensor object's field of view at each of plural animation time steps, and that counts and records a quantity of pixels corresponding to unobscured portions of the sensor object's field of view at each of the plural animation time steps; and a results signal segment that calculates, based on the quantities of pixels counted and recorded by said quantifying signal segment, and reports to a user percent obscuration of the sensor object's field of view over a predetermined time period.

20. The signal bearing medium of claim 19, the signal propagated via the signal bearing medium further comprising:

a projection signal segment that projects said sensor pattern from edges of said sensor object.

21. A computer system adapted to analyze sensor obscuration, comprising:

a processor, and a memory including software instructions adapted to enable the computer system to perform operations comprising:

animating a three-dimensional visualization of a satellite that includes a sensor object, the sensor object having a boresight and a sensor pattern;

selecting a view perspective from the sensor object along the boresight;

selecting objects of a satellite system analysis scenario that are capable of causing obscuration;

assigning a first color to the selected objects;

assigning to the sensor pattern a color that contrasts with the first color, such that, when the sensor pattern is superimposed over a visual display of the satellite system analysis scenario, portions of the sensor pattern that overlap with unselected objects and background appear in a different color than do portions of the sensor pattern that overlap with selected objects;

counting and recording the quantities of pixels of each color in the sensor pattern, the counting and recording being carried out at each time step of animation of the satellite system analysis scenario;

providing a graphical display to a user, during the animation, portraying the amount of obscuration of the sensor pattern, and source of obscuration of the sensor pattern, over a predetermined time period; and calculating the percentage of obscuration over said predetermined time period on the basis of the recorded pixel quantities, the calculated percentage of obscuration being displayed to the user.

22. The computer system adapted to analyze sensor obscuration of claim 21, said software instructions included in the memory being further adapted to enable the computer system to perform operations comprising:

translating a projection of the sensor pattern so that the sensor pattern is projected from edges of the sensor object.

23. A method of upgrading a satellite system analysis program that performs animated three-dimensional visualization of a satellite, the satellite having a sensor object, the sensor object having a sensor pattern and a boresight, the method comprising:

supplementing the available view perspectives for the satellite system analysis program so as to include a view from the sensor, along the boresight of the sensor;

supplementing the satellite system analysis program with a code segment that enables a user to select objects to be taken into account for analysis of obscuration of the sensor pattern as viewed along the boresight of the sensor;

supplementing the satellite system analysis program with a code segment that simplifies visual display, as viewed along the boresight of the sensor, to show selected objects in a first color;

supplementing the satellite system analysis program with a code segment that assigns colors to a representation of the sensor pattern of the sensor object, so as to distinguish those portions of the sensor object's field of view that are obscured by selected objects from those portions of the sensor object's field of view that are not obscured by selected objects;

supplementing the satellite system analysis program with a code segment that counts and records the quantity of pixels corresponding to obscured and unobscured portions of the sensor object's field of view at each of plural animation time steps; and supplementing the satellite system analysis program with a code segment that calculates, based on recorded quantities of pixels corresponding to obscured and unobscured portions of the sensor object's field of view at each of plural animation time steps, an obscuration percentage over a predetermined time period, the results of the calculations being reported to a user.

24. The method of upgrading a satellite system analysis program of claim 23, wherein the objects to be taken into account for obscuration analysis are selected from the group consisting of: the satellite, protrusions from the spacecraft, the central body about which the satellite orbits, and celestial bodies.

25. The method of upgrading a satellite system analysis program of claim 23, the method further comprising:

supplementing the satellite system analysis program with a translation option for the sensor object that projects the sensor pattern from the edges of the sensor object.

26. A computer program product for enabling a computer to upgrade a satellite system analysis program that performs animated three-dimensional visualization of a satellite, the satellite having a sensor object, the sensor object having a sensor pattern and a boresight, the computer program product comprising:

software instructions for enabling the computer to perform predetermined operations, and a computer readable medium embodying the software instructions;

the predetermined operations comprising:

supplementing the available view perspectives for the satellite system analysis program so as to include a view from the sensor, along the boresight of the sensor;

supplementing the satellite system analysis program with a code segment that enables a user to select objects to be taken into account for analysis of obscuration of the sensor pattern as viewed along the boresight of the sensor;

supplementing the satellite system analysis program with a code segment that simplifies visual display, as viewed along the boresight of the sensor, to show selected objects in a first color;

supplementing the satellite system analysis program with a code segment that assigns colors to a representation of the sensor pattern of the sensor object, so as to distinguish those portions of the sensor object's field of view that are obscured by selected objects from those portions of the sensor object's field of view that are not obscured by selected objects;

supplementing the satellite system analysis program with a code segment that counts and records the quantity of pixels corresponding to obscured and unobscured portions of the sensor object's field of view at each of plural animation time steps; and supplementing the satellite system analysis program with a code segment that calculates, based on recorded quantities of pixels corresponding to obscured and unobscured portions of the sensor object's field of view at each of plural animation time steps, an obscuration percentage over a predetermined time period, the results of the calculations being reported to a user.

27. The computer program product for enabling a computer to upgrade a satellite system analysis program recited in claim 26, wherein the objects to be taken into account for obscuration analysis are selected from the group consisting of:

the satellite, protrusions from the spacecraft, the central body about which the satellite orbits, and celestial bodies.

28. The computer program product for enabling a computer to upgrade a satellite system analysis program recited in claim 26, the predetermined operations further comprising:

supplementing the satellite system analysis program with a translation option for the sensor object that projects the sensor pattern from the edges of the sensor object.

* * * * *